(12) United States Patent
Cheung et al.

(10) Patent No.: US 8,412,972 B2
(45) Date of Patent: Apr. 2, 2013

(54) METHOD AND APPARATUS FOR REDUCING POWER CONSUMPTION FOR MEMORIES

(75) Inventors: Kin-Hang Cheung, San Jose, CA (US); Neelam Chandwani, Portland, OR (US); Chetan D. Hiremath, Portland, OR (US); Udayan Mukherjee, Portland, OR (US); Rakesh Dodeja, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 12/824,597

(22) Filed: Jun. 28, 2010

(65) Prior Publication Data

US 2011/0320847 A1    Dec. 29, 2011

(51) Int. Cl.
*G06F 11/30*    (2006.01)
(52) U.S. Cl. ..................... 713/340; 713/300
(58) Field of Classification Search .............. 713/300, 713/320, 323, 324
See application file for complete search history.

(56) References Cited

U.S. PATENT DOCUMENTS

| | | | |
|---|---|---|---|
| 7,688,666 B2 | 3/2010 | Choi et al. | |
| 8,055,922 B2 * | 11/2011 | Brittain et al. | 713/320 |
| 8,108,629 B2 * | 1/2012 | Shimizu et al. | 711/154 |
| 2004/0199801 A1 * | 10/2004 | Poisner | 713/323 |
| 2005/0125702 A1 | 6/2005 | Huang et al. | |
| 2007/0011421 A1 | 1/2007 | Keller et al. | |
| 2007/0283178 A1 | 12/2007 | Dodeja et al. | |
| 2008/0034234 A1 | 2/2008 | Shimizu et al. | |
| 2009/0249102 A1 | 10/2009 | Yong et al. | |
| 2009/0307505 A1 * | 12/2009 | Robertson et al. | 713/300 |
| 2011/0252180 A1 * | 10/2011 | Hendry et al. | 711/3 |

OTHER PUBLICATIONS

U.S. Appl. No. 12/752,955, filed Apr. 1, 2010; inventors: Rakesh Dodeja et al.
International Search Report and Written Opinion mailed Feb. 9, 2012 for Int'l Application No. PCT/US2011/041057.

* cited by examiner

*Primary Examiner* — Kim Huynh
*Assistant Examiner* — Alyaa Mazyad
(74) *Attorney, Agent, or Firm* — Blakely, Sokoloff, Taylor & Zafman LLP

(57) ABSTRACT

Described herein are a method and an apparatus for reducing power consumption of memories by monitoring the power states of the memories via an operating system. The method comprises reading counter values corresponding to power states of each memory of a plurality memories; computing a power state usage corresponding to the power states of each memory of the plurality, the computing based on the counter values; determining whether the power state usage exceeds a predetermined threshold usage; and adjusting current and future usage of each memory of the plurality in response to determining that the power state usage exceeds the predetermined threshold usage.

20 Claims, 5 Drawing Sheets

| Power State | Percentage power consumption per DIMM relative to idle power consumption | Exit Latency time |
|---|---|---|
| DIMM with all ranks active | 100% | 0ns |
| Clock Enable State (CKE) $CKE_A$ | 88% | 6-7.5ns |
| $CKE_F$ | 79% | 6-7.5ns |
| CKE (s or f), Termination (IBT) On | 42% ($CKE_S$) 63% ($CKE_F$) | 24-25ns ($CKE_S$) 6-7.5ns ($CKE_F$) |
| CKE (s or f), IBT OFF | 33% ($CKE_S$) 54% ($CKE_F$) | 24-25ns ($CKE_S$) 6-7.5ns ($CKE_F$) |
| Self Refresh (SR), PLL on, IBT off | 29% | 512 cycles |
| SR, PLL off, IBT off | 9.8% | 6us + 512 cycles |

METHOD AND APPARATUS FOR REDUCING POWER CONSUMPTION FOR MEMORIES

FIELD OF THE INVENTION

Embodiments of the invention relate generally to the field of memories. More particularly, embodiments of the invention relate to a method and an apparatus for reducing power consumption of memories by monitoring power states of the memories via an operating system.

BACKGROUND

In a typical memory system of a computer system, a memory controller facilitates the access of one or more memory modules in the computer system. Each memory module may include one or more memories that are referred to as ranks. As demand for lower power consumption of computer systems increases, power management of the memory modules and/or the ranks in the memory modules is needed. Power management of memories is even more imperative as demand for larger memories is increasing. For example, a memory of 4 Giga byte (Gb) size with 12 Dual-Inline Memory Modules (DIMMs) operating via a Double Data Rate (DDR) 3 I/O interface consumes about 28% of the total computer system power consumption when the memory is operating at its maximum bandwidth. A larger memory of 8 Gb size with 16 DIMMs on the same I/O interface consumes about 40% of the total computer system power consumption. The above trend becomes alarming for larger memories and faster I/O interfaces such as DDR 4 I/O interfaces.

Memory controllers manage power consumption of the memory modules and/or ranks mainly by disabling the clock signal to the memory modules that are identified as idle or inactive. A disabled clock signal reduces the dynamic power component of the total power consumption of the memory modules because logic gates of the memory modules that switch in response to the toggling of the clock signal no longer switch. The term idle or inactive herein refers to a period of time during which no data is read or written to the memory modules.

The amount of power consumption saved by disabling the clock signal depends on how long a memory (module(s) or independent ranks) remains in an idle state. Depending on how long a memory remains in the idle state, the memory controller may place the memory in one of several power states. Each power state has an associated latency time (also called the exit latency time) representing the time it takes to bring the memory from an idle state to a live state. Live or active state refers herein to a state of a memory (module(s) or independent ranks) in which the memory is receiving read and/or write commands from the memory controller.

If the memory controller determines that a memory (module(s) or independent ranks) will remain in an idle state longer than a predetermined threshold, it places the memory in a power state that has a longer latency time than another power state from among the several power states. A power state that has a longer latency time than another power state also means that it will cause the memory to take a longer time to become active. A longer latency time thus translates to lower computer performance because a user is not able to access the memory till the memory goes in active state.

The above described power management of the memory (module(s) or independent ranks) is not visible by any operating system. The operating system plays an active role in allocating memory of the memory modules including ranks for various operations/tasks. However such memory allocation does not take into account the power states of the memory (module(s) or independent ranks). Nor does the operating system know the duration the memory (module(s) or independent ranks) remains in a particular power state. During memory allocation for a current or future task, the operating system may allocate memory from a memory module having most of its ranks in idle state i.e., a lower power consumption state. Such allocation of memory may cause the entire memory module to enter an active state and lose potential power consumption savings from being in idle state because the operating system did not take into account the power state of the memory modules and/or ranks.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 3 is a table showing various power states monitored by the residency counters, according to one embodiment of the invention.

DETAILED DESCRIPTION

Figure 1:
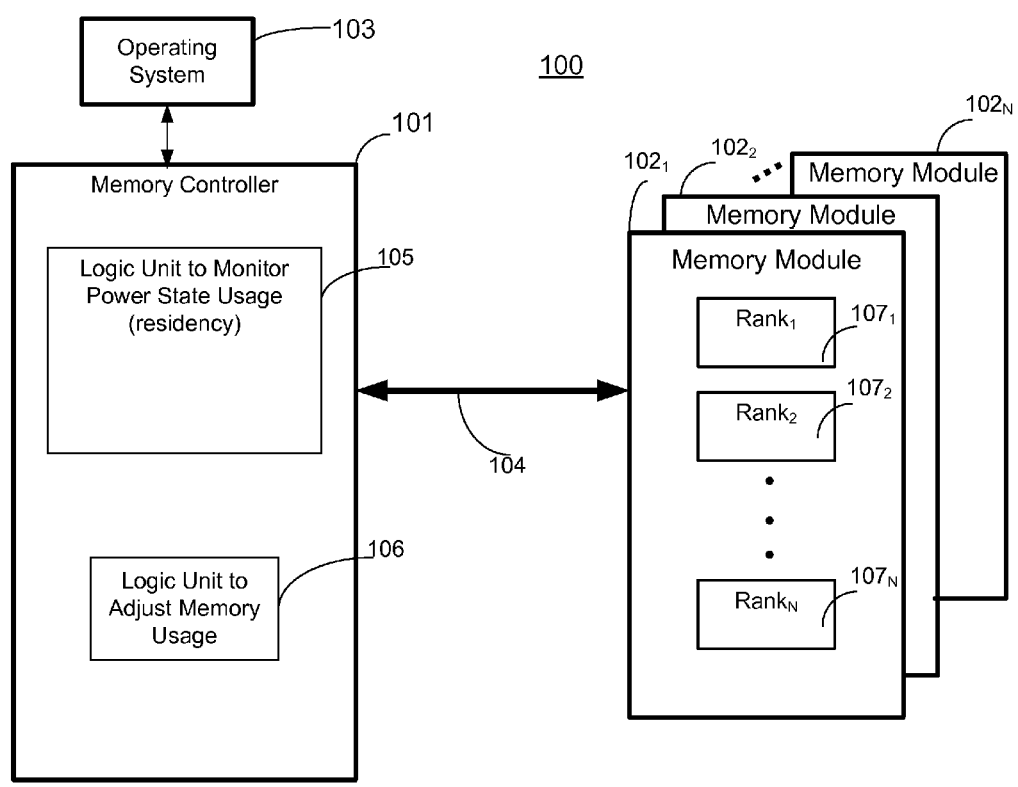
FIG. 1 is a memory system comprising a memory controller with logic to manage power consumption of memories via an operating system, according to one embodiment of the invention.

Embodiments of the invention relate to a method and an apparatus for reducing power consumption of memories by monitoring power states of the memories via an operating system. In one embodiment, the operating system determines the residency of the memories for every power state. In such an embodiment, the operating system allocates current and future usage of memory pages from the memories (module(s) or independent ranks) in response to determining the residency of the memories in various power states. The term memory herein refers to a memory rank and/or a memory module containing one or more memory ranks.

The term power state herein refers to the level of power consumption state of a memory. For example, the highest level of a power state represents a power state in which all memory ranks of a memory module are active i.e., are executing read and/or write operations. In such a power state, the exit latency is zero because the memory ranks never go into idle state. A lowest level of a power state represents a power state in which most high power consumption circuits are turned off e.g., the Phase Locked Loop (PLL) is turned off resulting in a disabled clock signal, the memory module goes in a self-refresh (SR) mode, the input-output (I/O) termination resistors are turned off, etc. In such a power state, the exit latency is the highest latency time because several circuits have to turn on before the memory module may go in active state. FIG. 3, which is discussed later, illustrates a Table 300 of exit latency times for various power states which an operating system takes into consideration before allocating memory for a given task.

The embodiments herein cause memory coalescing. Memory coalescing refers to partitioning of memories based on the various power states of the memory ranks or memory modules. In one embodiment, the operating system dynamically allocates current and future usage of memory pages by allocating and/or migrating memory pages from a memory that is operating below a predetermined threshold usage to a memory operating above a predetermined threshold usage.

The term dynamic herein refers to updating by an operating system the current and future usage of memory pages as soon as the operating system reads updated values of counters discussed later with reference to FIG. 1 and FIG. 2. In one embodiment, the operating system reads the values of the counters periodically e.g., every 10 milliseconds. In other embodiments, the operating system reads the values of the counters as soon as any counter value is updated.

Such dynamic reallocation and/or migration of memory pages, in one embodiment, results in 20-70% additional power consumption savings compared to memory systems that do not provide visibility to the operating system of residency of memory modules and/or ranks in various power states.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme, e.g., differential pair, single-ended, etc.

FIG. 1 is a memory system 100 comprising a memory controller 101 with a logic unit 105 to manage power consumption of memories via an operating system. In one embodiment, the memories are memory modules $102_{1-N}$. In one embodiment, each memory module of the memory modules $102_{1-N}$ has one or more memories called ranks $107_{1-N}$. In other embodiments, the memories are stand alone memory ranks (not shown). In one embodiment of the invention, the memory modules $102_{1-N}$ include ranks such as Synchronous Dynamic Random Access Memory (SDRAM), Dynamic Random Access Memory (DRAM), RAMBUS Dynamic Random Access Memory (RDRAM), double-data-rate four SDRAM (DDR4), and any other type of random access memory device.

So as not to obscure the embodiments of the invention, the embodiments herein are discussed with reference to a memory module $102_1$ being a Dual In-Line Memory Module (DIMM) having one or more SDRAMs $107_{1-N}$, which are also called ranks, where the DIMM is communicatively coupled to the memory controller 101 via a DDR 4 I/O interface. However, the above embodiments are not limiting embodiments. Other embodiments having different memory modules (other than the DIMM), or memories without memory modules, and other I/O interfaces (other than the DDR 4 I/O interface) can be used without changing the essence of the invention.

In one embodiment, the operating system 103 is a kernel such as Windows 7® operating system by MICROSOFT® which is configured to communicate with the memory controller 101. In another embodiment, the operating system 103 is a hypervisor with a virtual machine monitor (VMM) to interface with the memory controller 101. In one embodiment, the operating system 103 interfaces with the logic unit 105 to read residency of the memory modules $102_{1-N}$ (and/or individual ranks) in various power states. In one embodiment, the logic unit 105 includes counters to count residency of the memory modules $102_{1-N}$ or of individual ranks in various power states.

The term residency herein refers to a number of clock signal cycles a rank e.g., $107_1$, stays in a particular power state and a number of times the rank enters or exits a particular power state. The term residency herein is interchangeably used to refer to a number of clock signal cycles a memory module e.g., $102_1$, stays in a particular power state and a number of times the memory module enters or exits a particular power state. The term residency herein is also used interchangeably as the term power state usage.

In one embodiment, the memory controller 101 is integrated within a microprocessor (CPU). In other embodiments, the memory controller 101 is a separate integrated circuit (IC) on the motherboard and is coupled to the CPU (not shown) and the memory module 102. In one embodiment of the invention, the memory module $102_1$ includes DRAMs ($107_{1-N}$), register devices, buffer devices, etc. In one embodiment, the memory controller 101 communicates with the memory modules $102_{1-N}$ via signals 104 including, but not limited to, address signals, control signals, data signals, clock signals, parity signals, and any other signals to cause communication between the memory controller 101 and the memory module $102_{1-N}$.

In one embodiment, the memory controller 101 also includes a logic unit 106 which is operable to adjust current and future memory usage of each memory module of the memory modules $102_{1-N}$ via the operating system 103 in response to determining the residency (power state usage) of each memory module. In such an embodiment, the adjustment by the operating system 103 is dynamic. In one embodiment, the operating system 103 determines whether the power state usage of each memory module of the plurality of memory modules $102_{1-N}$ exceeds a predetermined threshold usage.

In one embodiment, the predetermined threshold usage is 20% of the power state usage. In other embodiments, the predetermined threshold usage is higher or lower than 20% of the power state usage and depends on how much power consumption savings is desired for the memory system. In one embodiment, the predetermined threshold usage is configurable by the operating system 103.

In one embodiment, the logic unit 106 adjusts the current and future memory usage of each memory module of the memory modules $102_{1-N}$ in response to determining that the power state usage exceeds the predetermined threshold usage. In one embodiment, the logic unit 106 is operable to adjust the power states of each memory module of the plurality of memory modules $102_{1-N}$ so that more memory modules of the plurality are in the lowest power state level. In such an embodiment, the operating system 103 monitors the power state usage of each memory module and/or ranks of the memory module and determines, in response to adjusting the current and future memory usage of each memory module and/or ranks, that certain memory modules may go in deeper (lower) power state levels to save power consumption without limiting the memory system performance. In one embodiment, such adjustment by the operating system 103 is dynamic. In one embodiment, such adjustment occurs for individual ranks rather than memory modules.

In one embodiment, the operating system 103 is operable to achieve deeper (lower) power state levels for memory modules of the plurality by reallocating future memory usage from a memory module operating below a predetermined threshold usage to a memory module operating above the predetermined threshold usage. In one embodiment, the operating system 103 is operable to achieve deeper (lower) power state levels for memory modules of the plurality by migrating current memory pages from a memory module operating below a predetermined threshold usage to a memory module operating above the predetermined threshold usage.

In the above embodiments, memory modules and/or ranks that are operating below the predetermined threshold usage are referred to as cold memory modules and/or ranks. Similarly, memory modules and/or ranks that are operating above the predetermined threshold usage are referred to as hot memory modules and/or ranks. The term operating above refers to the power state usage of the memory modules and/or ranks.

In one embodiment, the operating system 103 is operable to compute an average power state usage of each power state of each memory module of the plurality $102_{1-N}$, where the average power state usage is based on the number of clock signal cycles and the number of exit or entry transitions at different time intervals. In one embodiment, the operating system 103 uses the average power state usage to compare such usage with the predetermined threshold usage. As discussed above, in response to such comparing with the predetermined threshold usage, current and future memory usage of the memory modules and/or ranks is determined by the operating system 103.

Figure 2:
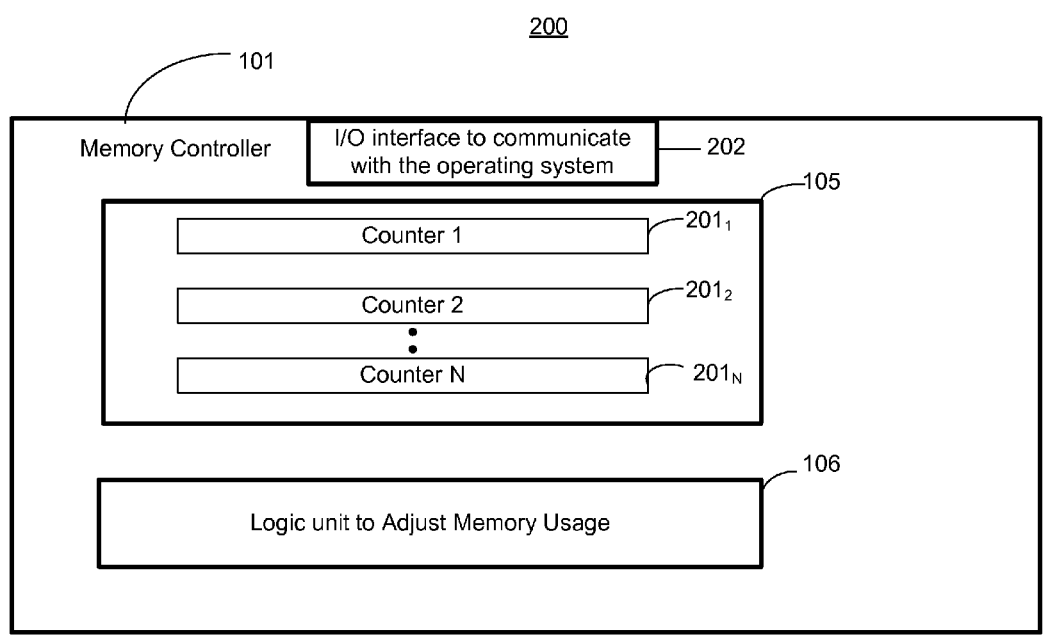
FIG. 2 is the memory controller with residency counters to count residency of each power state of the memories, according to one embodiment of the invention.

FIG. 2 is a logic level view 200 of the memory controller 101 with residency counters $201_{1-N}$ to determine residency (also referred to as power state usage) of each power state of the memory modules $102_{1-N}$ and/or ranks $107_{1-N}$, according to one embodiment of the invention. FIG. 2 is discussed with reference to the embodiments of FIG. 1.

In one embodiment, the memory controller 101 further comprises an I/O interface 202 to communicate with the operating system 103. In one embodiment, the I/O interface 202 is a DDR4 I/O interface. In other embodiments, the I/O interface is an interface other than the DDR4 I/O interface. The type of I/O interface does not change the principle of the embodiments of the invention.

In one embodiment, the residency counters $201_{1-N}$ (also referred to as the power state usage counters) are operable to count a number of clock signal cycles corresponding to each of the power states of each memory module of the plurality $102_{1-N}$ and/or the ranks $107_{1-N}$ in the memory modules. In one embodiment, the residency counters $201_{1-N}$ are also operable to count a number of exit or entry transitions of the power states of each memory module of the plurality $102_{1-N}$ and/or the ranks $107_{1-N}$ in the memory modules $102_{1-N}$. In one embodiment, the operating system 103 accesses or monitors the values of the residency counters $201_{1-N}$ to determine how to allocate current and future usage of memory pages within the memory modules $102_{1-N}$ or among ranks $107_{1-N}$. In one embodiment, this added visibility of the operating system 103 to the residency counters $201_{1-N}$ allows the operating system to dynamically reallocate future memory pages to memory modules and/or ranks that are hot from memory modules and/or ranks that are cold.

In such an embodiment, the dynamic reallocation of future usage of memory pages and migration of current usage of memory pages from cold memory modules and/or ranks to hot memory modules and/or ranks lowers overall power consumption of the memory system 100. One reason for lowering overall power consumption of the memory system 100 is that the number of cold memory modules and/or ranks become larger in number than before, thus resulting in more memory modules and/or ranks to go in deeper (lower) power state levels than when the operating system 103 did not have such visibility to the residency counters $201_{1-N}$.

By placing the cold memory modules and/or ranks in deeper (lower) power state levels by the operating system 103, long exit latency times are no longer a computer performance hindrance because the operating system 103 is now aware of which memory modules and/or ranks are in deeper (lower) power state levels and so it avoids allocating current or future memory pages to the cold memory modules and/or ranks. This is in contrast to the operating system not having access to residency counters or residency usage (power state usage) of the memory modules and/or ranks that results in allocating current or future memory pages irrespective to the power states of the memory modules and/or ranks.

In one embodiment, the residency counters $201_{1-N}$ are operable to count periodically the residency of the memory modules and/or ranks in each power state to compute the average residency of each memory module and/or ranks in each power state. In one embodiment, the period of counting the residency is 10 milliseconds. In other embodiments, the period of counting the residency is smaller or larger than 10 milliseconds. In one embodiment, the period of counting is configurable by the operating system.

FIG. 3 is a Table 300 showing various power states monitored by the residency counters that the operating system 103 uses to manage power consumption of the memory system 100, according to one embodiment of the invention. FIG. 3 is described with reference to embodiments of FIG. 1 and FIG. 2.

Column 301 provides a list of power states from the highest power state level 304 to the lowest power state level 305, according to one embodiment. This list of power states is not a limiting list. In one embodiment, a memory system may have fewer or more power states than the ones shown in Table 300.

As mentioned above, the highest power state level 304 represents the state of the memory modules when all ranks of memory modules are active. Power consumption is at the highest level at this power state level. The lowest power state level 305 represents the state of memory modules when the memory modules are least active. Power consumption is at the lowest level at this power state level. In one embodiment, the power states in column 301 refer to power states of the ranks.

Column 302 provides a corresponding list of power consumptions in percentage per DIMM relative to idle power consumption (i.e., the lowest possible power consumption of the DIMM). Column 303 provides a corresponding list of exit latency time measured in time and/or clock signal cycles. The lowest power state level 305 corresponds to the longest exit latency time.

In one embodiment, the operating system 103 is aware of the power state levels and the latency times. The operating system 103 uses the information of Table 300 along with the residency information from the residency counters $201_{1-N}$ to allocate current and future usage of memory pages so that there are more cold memory modules and/or ranks than previously possible without embodiments discussed herein.

In one embodiment, the operating system 103 analyzes a given task and determines how much memory and how often memory operations are needed for such a task. In such an embodiment, the operating system 103 determines which memory module and/or rank would generate the most possible power consumption savings in view of the exit latency times. In response to such determination, the operating system dynamically allocates current and future memory pages for the task as discussed above with reference to FIG. 1 and FIG. 2.

For example, if a task requires memory but with least possible memory operations, then the operating system 103 may dynamically allocate the memory for such a task that corresponds to the deepest power state level 305.

Figure 4:
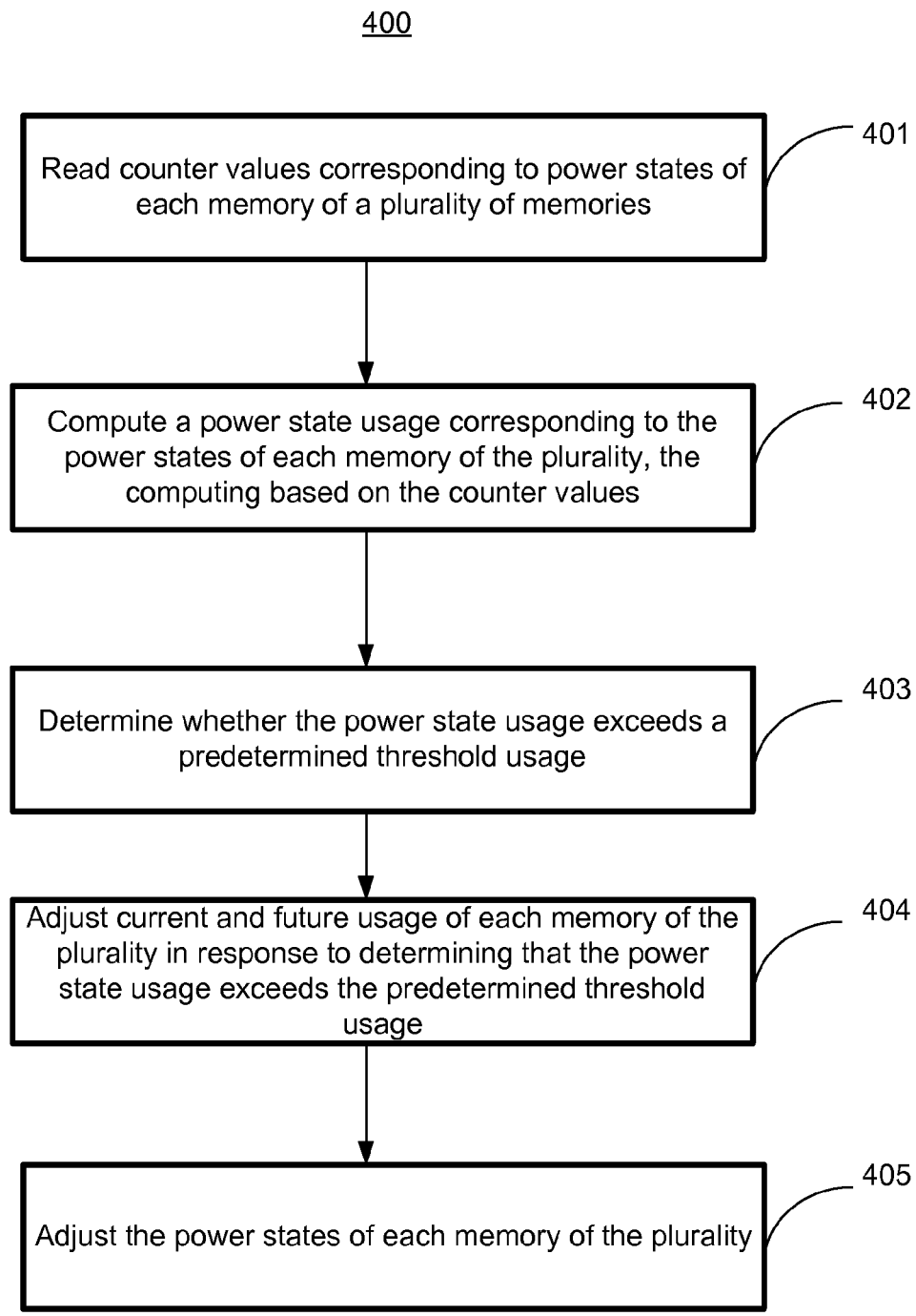
FIG. 4 is a flow chart of a method of managing power consumption of memories via the residency counters and the operating system, according to one embodiment of the invention.

FIG. 4 is a flow chart 400 of a method of managing power consumption of memory modules and/or ranks via the residency counters $201_{1-N}$ and the operating system 103, according to one embodiment of the invention. The method is discussed with reference to the embodiments of FIGS. 1-3.

At block 401, the operating system 103 reads counter values from the counters $201_{1-N}$ of the logic unit 105 corresponding to the power states of each memory of the plurality of memories. In one embodiment, the plurality of memories comprises memory modules $102_{1-N}$ having memory ranks. In other embodiments, the plurality of memories consists of memory ranks $107_{1-N}$. In one embodiment, the operating system 103 reads the values of the counters $201_{1-N}$ via an I/O interface 202 of the memory controller 101.

At block 402, the operating system 103 computes a power state usage (residency) corresponding to the power states of each module of the plurality, where the computing is based on the counter values from counters $201_{1-N}$ of the logic unit 105. In one embodiment, the operating system 103 and/or logic unit (not shown) in the memory controller 101 computes the power state usage by computing an average power state usage of each power state of each memory of the plurality of memories, where the average power state usage is based on the number of clock signal cycles and the number of exit or entry transitions at different time intervals.

At block 403, the operating system 103 and/or a logic unit (not shown) in the memory controller 101 determines whether the power state usage exceeds a predetermined threshold usage. In one embodiment, the predetermined threshold usage is set by the operating system. At block 404, the logic unit 106 adjusts current and future memory usage of each memory of the plurality in response to determining that the power state usage exceeds the predetermined threshold usage. As mentioned above, the operating system 103 dynamically adjusts the current and future memory usage by reallocating future usage from a memory operating below the predetermined threshold usage to a memory operating above the predetermined threshold usage, and by migrating current pages from a memory operating below the predetermined threshold usage to a memory operating above the predetermined threshold usage.

At block 405, the operating system 103 and/or the logic unit 106 (or a separate logic unit) dynamically adjusts the power states of each memory module of the plurality $102_{1-N}$ in response to adjusting the current and future memory usage of each memory module of the plurality. In one embodiment, the power state is adjusted by moving the power state from one level to another level. For example, if the operating system 103 allocates memory from memory module $102_1$ so that such memory will be always active, then the power state of such memory module $102_1$ may be adjusted to a highest power state level which has zero or close to zero exit latency.

Figure 5:
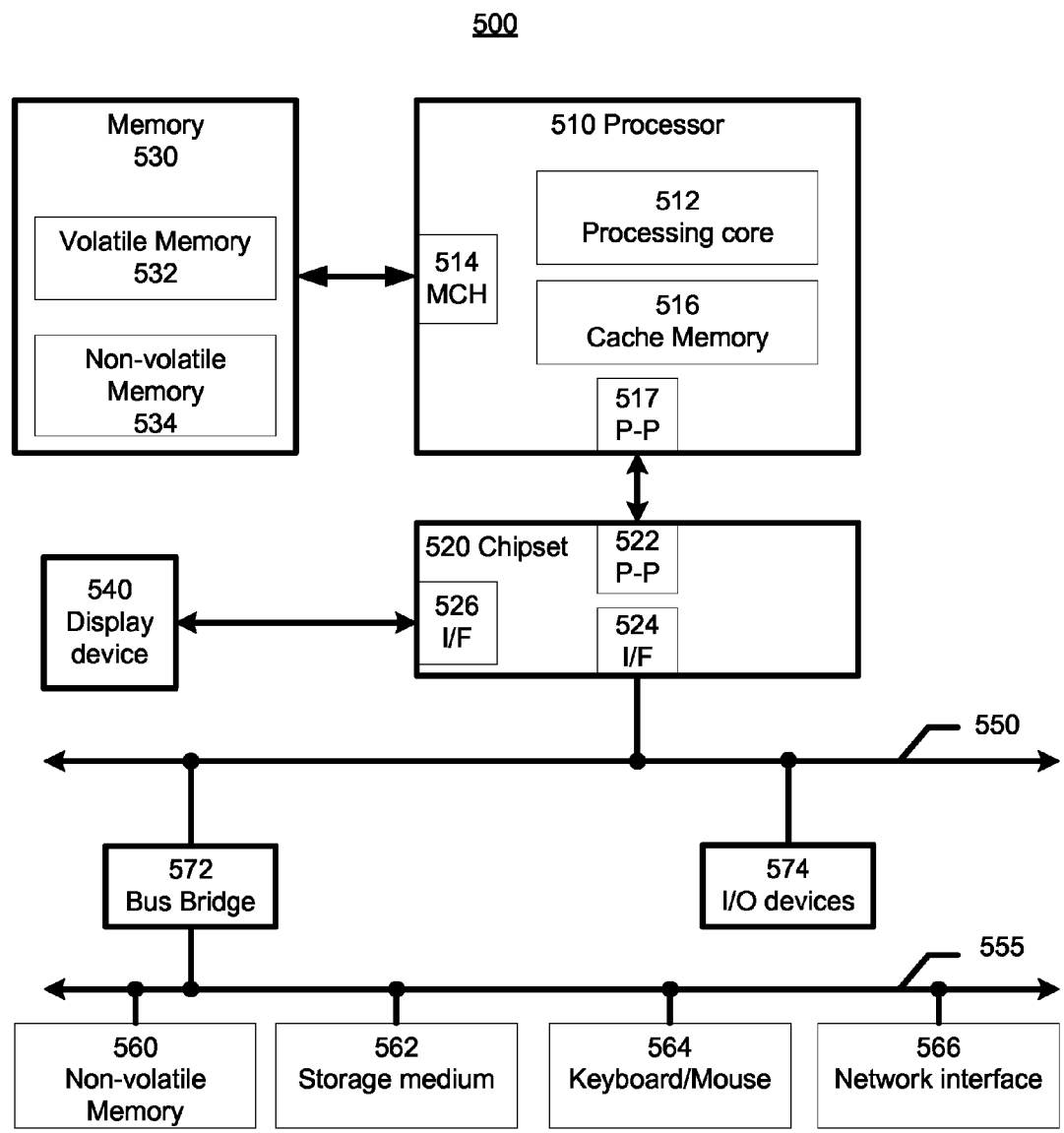
FIG. 5 is computer system to implement the method for managing power consumption of memories, according to one embodiment of the invention.

FIG. 5 is computer system 500 to implement the method for managing power consumption of memory modules, according to one embodiment of the invention. Embodiments of the invention are also implemented via programmable computer-executable instructions stored on a machine-readable storage medium. For example, the method of FIG. 4 is programmable and executable by a computer. The machine-readable storage medium may include, but is not limited to, flash memory, optical disks, CD-ROMs, DVD ROMs, RAMs, EPROMs, EEPROMs, magnetic or optical cards, or other types of machine-readable storage media suitable for storing electronic or computer-executable instructions. For example, embodiments of the invention may be downloaded as a computer program which may be transferred from a remote computer (e.g., a server) to a requesting computer (e.g., a client) by way of data signals via a communication link (e.g., a modem or network connection).

In one embodiment, the system 500 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 400 used to implement the methods disclosed herein may be a system on a chip (SOC) system.

In one embodiment, the processor 510 has a processing core 512 to execute instructions of the system 500. In one embodiment, the processing core 512 includes, but is not limited to, pre-fetch logic to fetch instructions, decode logic to decode the instructions, execution logic to execute instructions and the like. In one embodiment, the processor 510 has a cache memory 516 to cache instructions and/or data of the system 500.

In one embodiment, the cache stores the instructions to execute the method of FIG. 4. In another embodiment of the invention, the cache memory 516 includes level one, level two and level three, cache memory, or any other configuration of the cache memory within the processor 510.

The memory controller 101, which is also referred to as the memory control hub (MCH) 514, is operable to perform functions that enable the processor 510 to access and communicate with a memory 530 that includes a volatile memory 532 and/or a non-volatile memory 534. The volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 534 includes, but is not limited to, flash memory, phase change memory (PCM), read-only memory (ROM), electrically erasable programmable read-only memory (EEPROM), or any other type of non-volatile memory device.

The memory 530 stores information and instructions to be executed by the processor 510. In one embodiment, memory 530 may also store temporary variables or other intermediate information while the processor 510 is executing instructions. In one embodiment, chipset 520 connects with processor 510 via Point-to-Point (PtP or P-P) interfaces 517 and 522. In one embodiment, chipset 520 enables processor 510 to connect to other modules in the system 500. In one embodiment of the invention, interfaces 517 and 522 operate in accordance with a PtP communication protocol such as the Intel® QuickPath Interconnect (QPI) or the like.

In one embodiment, chip set 520 connects to a display device 540 via interface 526. In one embodiment, the display 540 includes, but is not limited to, liquid crystal display (LCD), cathode ray tube (CRT) display, or any other form of visual display device. In one embodiment of the invention, processor 510 and chipset 520 are merged into a SOC. In addition, chipset 520 connects to one or more buses 550 and 555 via an interface 524. In one embodiment, the one or more buses 550 and 555 interconnect various modules 574, 560, 562, 564, and 566. In one embodiment, buses 550 and 555 may be interconnected together via a bus bridge 572 if there is a mismatch in bus speed or communication protocol. In one embodiment, chipset 520 couples with, but is not limited to, a non-volatile memory 560, a mass storage device(s) 562, a keyboard/mouse 564 and a network interface 566.

In one embodiment, the mass storage device 562 includes, but is not limited to, a solid state drive, a hard disk drive, a universal serial bus flash memory drive, or any other form of computer data storage medium. In one embodiment, network interface 566 is implemented by any type of well known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any other form of wireless communication protocol.

While the modules shown in FIG. 5 are depicted as separate blocks within the system 500, the functions performed by some of these blocks may be integrated within a single semiconductor circuit or may be implemented using two or more separate integrated circuits. For example, although the cache memory 516 is depicted as a separate block within the processor 510, the cache memory 516 can be incorporated into the processor core 512 respectively. In one embodiment, the system 500 may include more than one processor/processing core in another embodiment of the invention.

The term operable used herein means that the device, module, system, logic unit, protocol etc, is able to operate or is adapted to operate for its desired functionality when the device, module, system, or logic unit is in off-powered state.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description.

For example, the residency counters $201_{1-N}$ can be implemented with any known architecture of counters and can be of any number of bits needed to store the residency information of all memory modules and/or ranks. In one embodiment, the memory comprises stand alone ranks which are not contained in a memory module. In such an embodiment, the operating system 103, via the memory controller 101, is operable to monitor the residency of the stand alone ranks instead of the memory module(s) and then uses that information to reallocate and/or migrate current and future memory usage between the stand alone ranks.

The embodiments of the invention are intended to embrace all such alternatives, modifications, and variations as to fall within the broad scope of the appended claims.

We claim:

1. A method comprising:
    reading values from counters, the values corresponding to power states of each memory of a plurality memories;
    computing a power state usage corresponding to the power states of each memory of the plurality, the computing based on the counter values, wherein the power state usage indicates a number of times each memory of the plurality remains in a power state and a number of times each memory enters or exits a particular power state;
    determining whether the power state usage exceeds a predetermined threshold usage; and
    adjusting current and future usage of each memory of the plurality in response to determining that the power state usage exceeds the predetermined threshold usage.

2. The method of claim 1 further comprising adjusting the power states of each memory of the plurality in response to adjusting the current and future usage of each memory of the plurality.

3. The method of claim 1 further comprising:
    counting with one of the counters a number of clock signal cycles corresponding to the power states of each memory of the plurality of memories; and
    counting with another of the counters a number of exit or entry transitions of the power states for each memory of the plurality of memories.

4. The method of claim 3, wherein computing the power state usage comprises computing an average power state usage of each power state of each memory of the plurality, the average power state usage based on the number of clock signal cycles and the number of exit or entry transitions at different time intervals.

5. The method of claim 1, wherein reading the counters comprises accessing an I/O interface of a memory controller via an operating system.

6. The method of claim 5, wherein the predetermined threshold usage is set by the operating system.

7. The method of claim 1, wherein adjusting the current and future usage of each memory of the plurality comprises:
    reallocating future usage from a memory operating below the predetermined threshold usage to a memory operating above the predetermined threshold usage; and
    migrating current pages from a memory operating below the predetermined threshold usage to a memory operating above the predetermined threshold usage.

8. An apparatus comprising:
    a counter to generate a value corresponding to power states of each memory of a plurality of memories;
    a first logic unit to compute a power state usage corresponding to power states of each memory of the plurality, the computing based on the counter value, wherein the power state usage indicates a number of times each memory of the plurality remains in a power state and a number of times each memory enters or exits a particular power state;
    a second logic unit to determine when the power state usage exceeds a predetermined threshold usage; and a third logic unit to adjust current and future usage of each memory of the plurality in response to the second logic unit determining that the power state usage exceeds the predetermined threshold.

9. The apparatus of claim 8 further comprising a fourth logic unit to adjust the power states of each memory of the plurality in response to the third logic unit adjusting the current and future usage of each memory of the plurality.

10. The apparatus of claim 8, wherein the counter comprises:
   a first counter to count a number of clock signal cycles corresponding to the power states of each memory of the plurality of memories; and
   a second counter to count a number of exit or entry transitions of the power states for each memory of the plurality of memories.

11. The apparatus of claim 8 further comprising an I/O interface for accessing the value of the counter via an operating system.

12. The apparatus of claim 11, wherein the I/O interface comprises a Dual Data Rate 4 (DDR4) I/O interface.

13. The apparatus of claim 8, wherein the predetermined threshold usage is set by an operating system.

14. The apparatus of claim 8, wherein the third logic unit is operable to adjust the current and future usage of each memory of the plurality by:
   reallocating future usage from a memory operating below the predetermined threshold usage to a memory operating above the predetermined threshold usage; and
   migrating current pages from a memory operating below the predetermined threshold usage to a memory operating above the predetermined threshold usage.

15. The apparatus of claim 8, wherein the memory is a Dynamic Random Access Memory (DRAM), and wherein the plurality of memories reside in one or more modules including Dual In-Line Memory Modules (DIMMs).

16. A system comprising
   a memory having a plurality of memory modules; and
   a memory controller coupled to the memory and comprising:
      a counter to generate a value corresponding to power states of each memory module of the plurality of memory modules;
      a first logic unit to compute a power state usage corresponding to power states of each memory module of the plurality, the computing based on the counter value, wherein the power state usage indicates a number of times each memory of the plurality remains in a power state and a number of times each memory enters or exits a particular power state;
      a second logic unit to determine when the power state usage exceeds a predetermined threshold usage; and
      a third logic unit to adjust current and future usage of each memory module of the plurality in response to the second logic unit determining that the power state usage exceeds the predetermined threshold.

17. The system of claim 16, wherein the memory controller further comprises a fourth logic unit to adjust the power states of each memory module of the plurality in response to the third logic unit adjusting the current and future usage of each memory module of the plurality.

18. The system of claim 16, wherein the counter comprises:
   a first counter to count a number of clock signal cycles corresponding to the power states of each memory module of the plurality of memory modules; and
   a second counter to count a number of exit or entry transitions of the power states for each memory module of the plurality of memory modules.

19. The system of claim 16, wherein the third logic unit is operable to adjust the current usage and future memory usage for each memory module of the plurality by:
   reallocating future memory usage from a memory module operating below the predetermined threshold usage to a memory module operating above the predetermined threshold usage; and
   migrating current memory pages from a memory module operating below the predetermined threshold usage to a memory module operating above the predetermined threshold usage.

20. The system of claim 16 further comprising an I/O interface for accessing the value of the counter via an operating system, wherein the predetermined threshold usage is set by the operating system, wherein the memory modules comprise Dual In-Line Memory Modules (DIMMs), and wherein the I/O interface comprises a Dual Data Rate 4 (DDR4) I/O interface.

* * * * *